(12) United States Patent
Doucet

(10) Patent No.: US 9,791,651 B1
(45) Date of Patent: Oct. 17, 2017

(54) REDUCTION OF FARADAY EFFECT IN OPTICAL GROUND WIRE (OPGW) CABLES

(71) Applicant: David Raymond Doucet, Almonte (CA)

(72) Inventor: David Raymond Doucet, Almonte (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/281,761

(22) Filed: Sep. 30, 2016

(51) Int. Cl.
  *G02B 6/44* (2006.01)
(52) U.S. Cl.
  CPC ......... *G02B 6/4417* (2013.01); *G02B 6/4413* (2013.01)
(58) Field of Classification Search
  None
  See application file for complete search history.

(56) References Cited

U.S. PATENT DOCUMENTS

| | | | | |
|---|---|---|---|---|
| 4,952,012 A | * | 8/1990 | Stamnitz | G02B 6/4416 385/101 |
| 2008/0236867 A1 | * | 10/2008 | Varkey | H01B 7/046 174/115 |
| 2015/0170799 A1 | * | 6/2015 | Varkey | G02B 6/4416 174/70 R |

FOREIGN PATENT DOCUMENTS

JP  2015191788 A  * 11/2015

OTHER PUBLICATIONS

Sato et al, Machine translation of JP 2015-191788 A, Nov. 2015.*
Silverstone Electric, "Cable, Conductor OPGW & Accessories", 2015.

* cited by examiner

*Primary Examiner* — Hemang Sanghavi
(74) *Attorney, Agent, or Firm* — Integral Intellectual Property Inc.; Miriam Paton; Amy Scouten

(57) ABSTRACT

New optical ground wire (OPGW) cable structures are proposed. These OPGW cables are designed to reduce or minimize the net magnetic field $B_{\|}^{NET}$ parallel to the direction $\hat{z}$ of light propagation resulting from a lightning strike on the cable. A reduction in the net magnetic field $B_{\|}^{NET}$ parallel to the direction $\hat{z}$ of light propagation yields a reduction in the amount and speed of state of polarization (SOP) rotation resulting from a lightning strike on the cable due to the Faraday effect. OPGW cables constructed according to these new OPGW cable structures fulfill their dual function to shield the high-voltage conductors from lightning strikes and to support coherent optical communications.

12 Claims, 15 Drawing Sheets

REDUCTION OF FARADAY EFFECT IN OPTICAL GROUND WIRE (OPGW) CABLES

TECHNICAL FIELD

This document relates to the technical field of optical ground wire (OPGW), also known as "optical fiber composite overhead ground wire".

BACKGROUND

Overhead power lines used in electric power transmission and distribution are high-voltage conductors suspended by towers. Cables of optical ground wire (OPGW), also known as "optical fiber composite overhead ground wire", are run between the tops of the towers, serving to ground the towers and to shield the high-voltage conductors from lightning strikes.

The optical fibers within an OPGW cable can be used for data communications. Information can be encoded using the amplitude, the phase, and the polarization of the light that is propagated through the optical fibers.

There is a well-known interaction between light and a magnetic field. The Faraday effect causes a rotation of the plane of polarization which is linearly proportional to the component of the magnetic field in the direction of light propagation.

SUMMARY

Example optical ground wire (OPGW) cables as proposed in this document are constructed of a core element that carries one or more optical fibers, the core element surrounded by N layers of concentric stranded wires, where N is an integer and $N \geq 2$. The wires are stranded in a right-hand, clockwise (CW) lay direction in M of the layers, and the wires are stranded in a left-hand, counter-clockwise (CCW) lay direction in the remaining (N−M) layers, where M is an integer, M is less than N, and $M \geq 1$. Concentric stranding provides the proposed OPGW cable with mechanical stability and integrity, including mechanical strength, crush resistance, and bending flexibility.

The optical fibers of the OPGW cable can be used for data communications. Information can be encoded using the amplitude, the phase, and the polarization of the light that is propagated through the optical fibers. Current flow in the wire strands of the N layers due to a lightning strike results in a net magnetic field $B_{\parallel}^{NET}$ parallel to the direction $\hat{z}$ of light propagation. Due to the Faraday effect, the net magnetic field $B_{\parallel}^{NET}$ parallel to the direction $\hat{z}$ of light propagation causes a change in the light's state of polarization (SOP). If the magnetic field changes quickly, there will be an equivalent rate of change on the optical signal's SOP. Unexpected changes to the optical signal's SOP, especially high speed SOP transients that occur when lightning strikes the cable, can be disruptive to coherent optical communications and may result in impairments within the coherent optical communications system.

This document proposes new OPGW cable structures designed to reduce or minimize the net magnetic field $B_{\parallel}^{NET}$ parallel to the direction $\hat{z}$ of light propagation resulting from a lightning strike on the cable. A reduction in the net magnetic field $B_{\parallel}^{NET}$ parallel to the direction $\hat{z}$ of light propagation yields a reduction in the amount and speed of SOP rotation resulting from a lightning strike on the cable due to the Faraday effect. OPGW cables constructed according to these new OPGW cable structures fulfill their dual function to shield the high-voltage conductors from lightning strikes and to support coherent optical communications.

The reduction or minimization of the net magnetic field $B_{\parallel}^{NET}$ is achieved by designing the new OPGW structure to balance or equalize total contributions to the net magnetic field $B_{\parallel}^{NET}$ from the M layers whose wires are stranded in the right-hand, CW lay direction and total contributions to the net magnetic field $B_{\parallel}^{NET}$ from the remaining (N−M) layers whose wires are stranded in the left-hand, CCW lay direction.

DETAILED DESCRIPTION

Mechanical Structure of OPGW Cable

Example optical ground wire (OPGW) cables as proposed in this document are constructed of a core element that carries one or more optical fibers, the core element surrounded by N layers of concentric stranded wires, where N is an integer and $N \geq 2$. The wires are stranded in a right-hand, clockwise (CW) lay direction in M of the layers, and the wires are stranded in a left-hand, counter-clockwise (CCW) lay direction in the remaining (N−M) layers, where M is an integer, M is less than N, and M≥1. Concentric stranding provides the proposed OPGW cable with mechanical stability and integrity, including mechanical strength, crush resistance, and bending flexibility.

FIG. 1, FIG. 2, FIG. 3, FIG. 4, FIG. 5 and FIG. 6 are cut-away illustrations of various example OPGW cables 100 as proposed in this document. In these examples, the cable 100 is constructed of a core element 102 that carries one or more optical fibers 104. A direction $\hat{z}$ of light propagation within the optical fibers 104 is shown.

Figure 1:
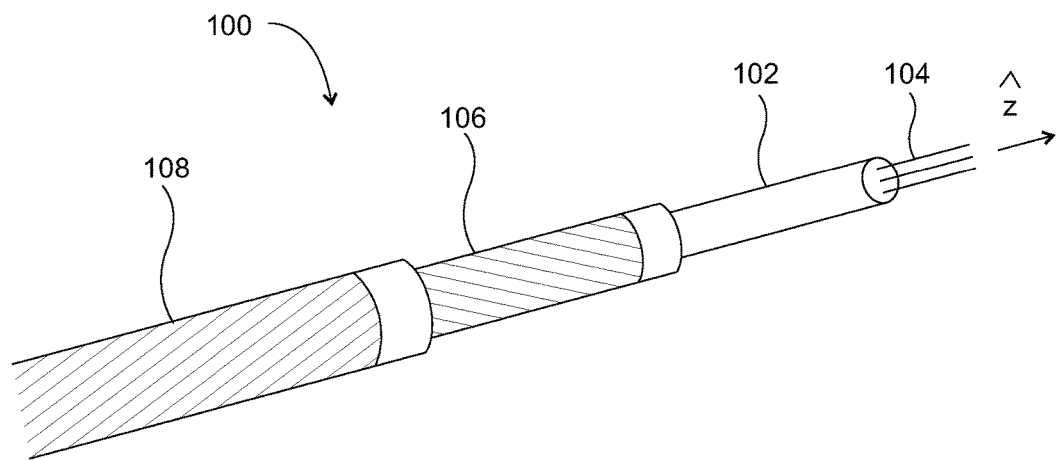
FIG. 1, FIG. 2, FIG. 3, FIG. 4, FIG. 5 and FIG. 6 are cut-away illustrations of various example optical ground wire (OPGW) cables.
Figure 2:
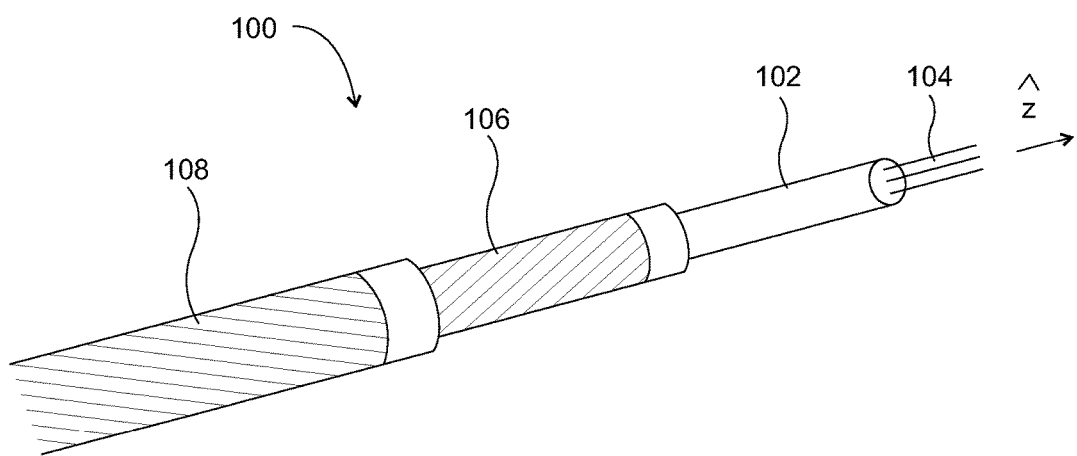

The cables shown in FIG. 1 and FIG. 2 have two layers of concentric stranded wires. The cables shown in FIG. 3 and FIG. 4 have three layers of concentric stranded wires. The cables shown in FIG. 5 and FIG. 6 have four layers of concentric stranded wires. Other example cables (not shown) may have more than four layers of concentric stranded wires.

The wire strands of a first layer 106 form a multi-stranded first helix structure around the core element 102. The wire strands of a second layer 108 form a multi-stranded second helix structure around the first layer 106. If a third layer 110 exists, the wire strands of the third layer 110 form a multi-stranded third helix structure around the second layer 108. If a fourth layer 112 exists, the wire strands of the fourth layer 112 form a multi-stranded helix structure around the third layer 110.

The wires are stranded in a right-hand, CW lay direction in M of the layers, and the wires are stranded in a left-hand, CCW lay direction in the remaining (N−M) layers, where M is an integer, M is less than N, and M≥1. For a two-layer cable, the lay direction of the wire strands of the first layer 106 is reverse to the lay direction of the wire strands of the second layer 108. For a three-layer cable, the lay direction of the wire strands of one of the layers is reverse to the lay direction of the wire strands of the other two layers. For a four-layer cable, the lay direction of the wires of two of the layers is reverse to the lay direction of the wire strands of the other two layers, or the lay direction of the wires of one layer is reverse to the lay direction of the wire strands of the other three layers.

FIG. 1 illustrates a right-hand, CW lay direction for the wire strands of the first layer 106 and a left-hand, CCW lay direction for the wire strands of the second layer 108.

FIG. 2 illustrates a left-hand, CCW lay direction for the wire strands of the first layer 106 and a right-hand, CW lay direction for the wire strands of the second layer 108.

Figure 3:
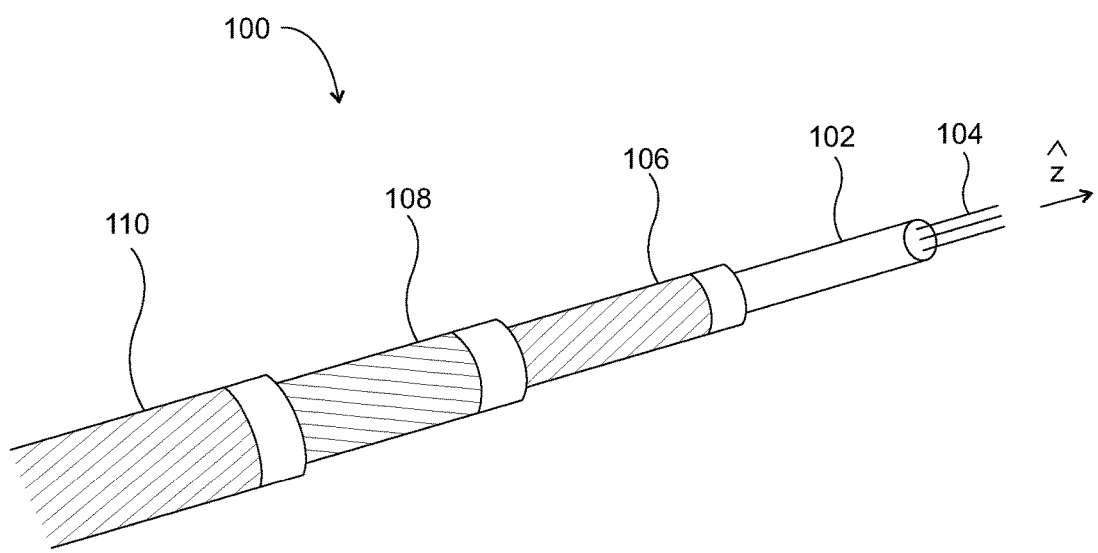

FIG. 3 illustrates a left-hand, CCW lay direction for the wire strands of the first layer 106, a right-hand, CW lay direction for the wire strands of the second layer 108, and a left-hand, CCW lay direction for the wire strands of the third layer 110.

Figure 4:
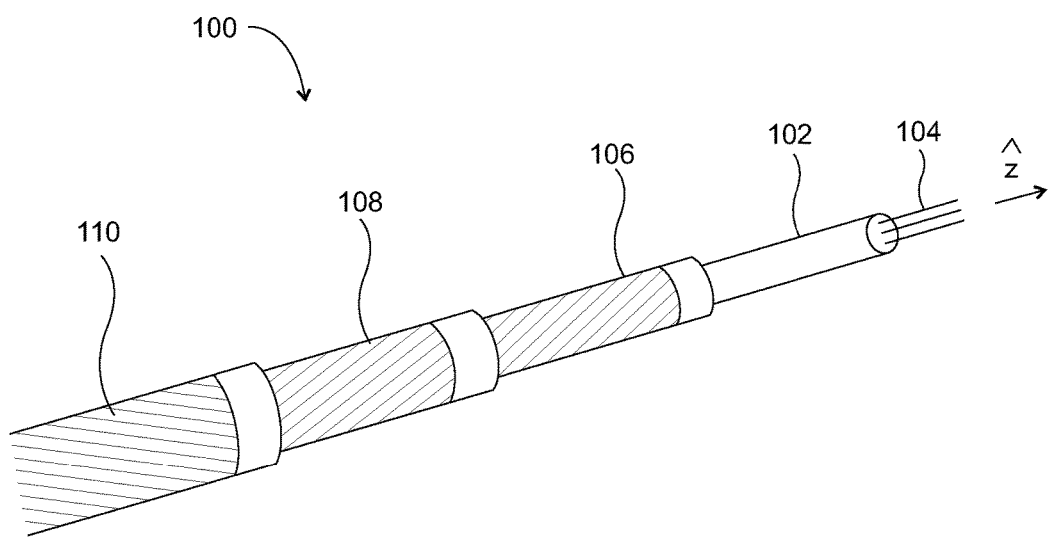

FIG. 4 illustrates a left-hand, CCW lay direction for the wire strands of the first layer 106 and for the wire strands of the second layer 108, and a right-hand, CW lay direction for the wire strands of the third layer 110.

Figure 5:
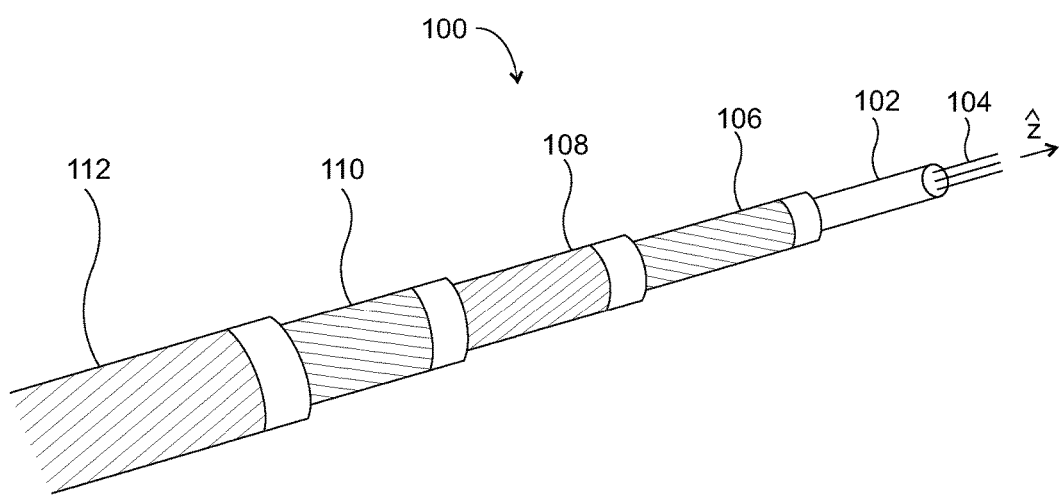

FIG. 5 illustrates a four-layer cable with alternating lay directions. There is a right-hand, CW lay direction for the wire strands of the first layer 106 and for the wire strands of the third layer 110, and a left-hand, CCW lay direction for the wire strands of the second layer 108 and for the wire strands of the fourth layer 112.

Figure 6:
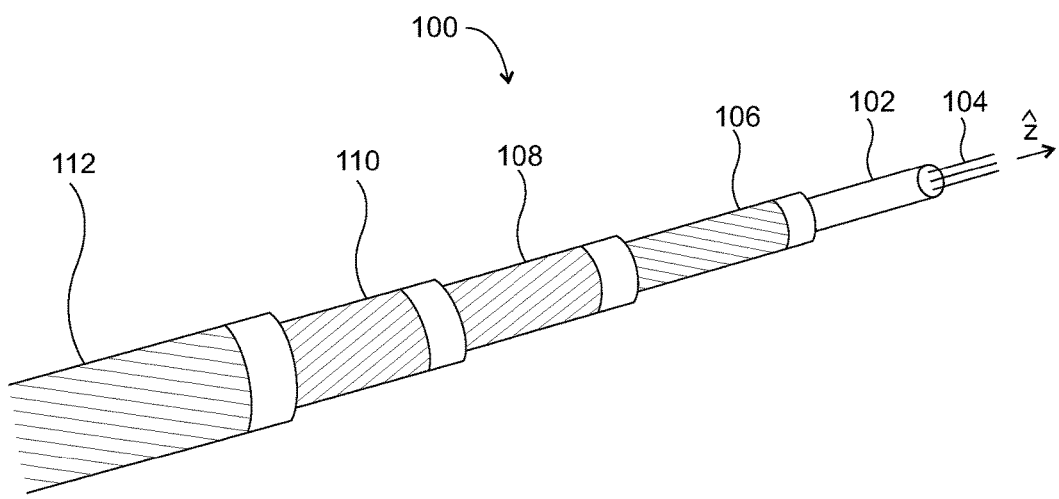

FIG. 6 illustrates a four-layer cable with the two middle layers having a reverse lay direction to the inner layer and to the outer layer. There is a right-hand, CW lay direction for the wire strands of the first layer 106 and for the wire strands of the fourth layer 112, and a left-hand, CCW lay direction for the wire strands of the second layer 108 and for the wire strands of the third layer 110.

Lighting Strikes on OPGW Cable Cause State of Polarization (SOP) Transients

Figure 7:
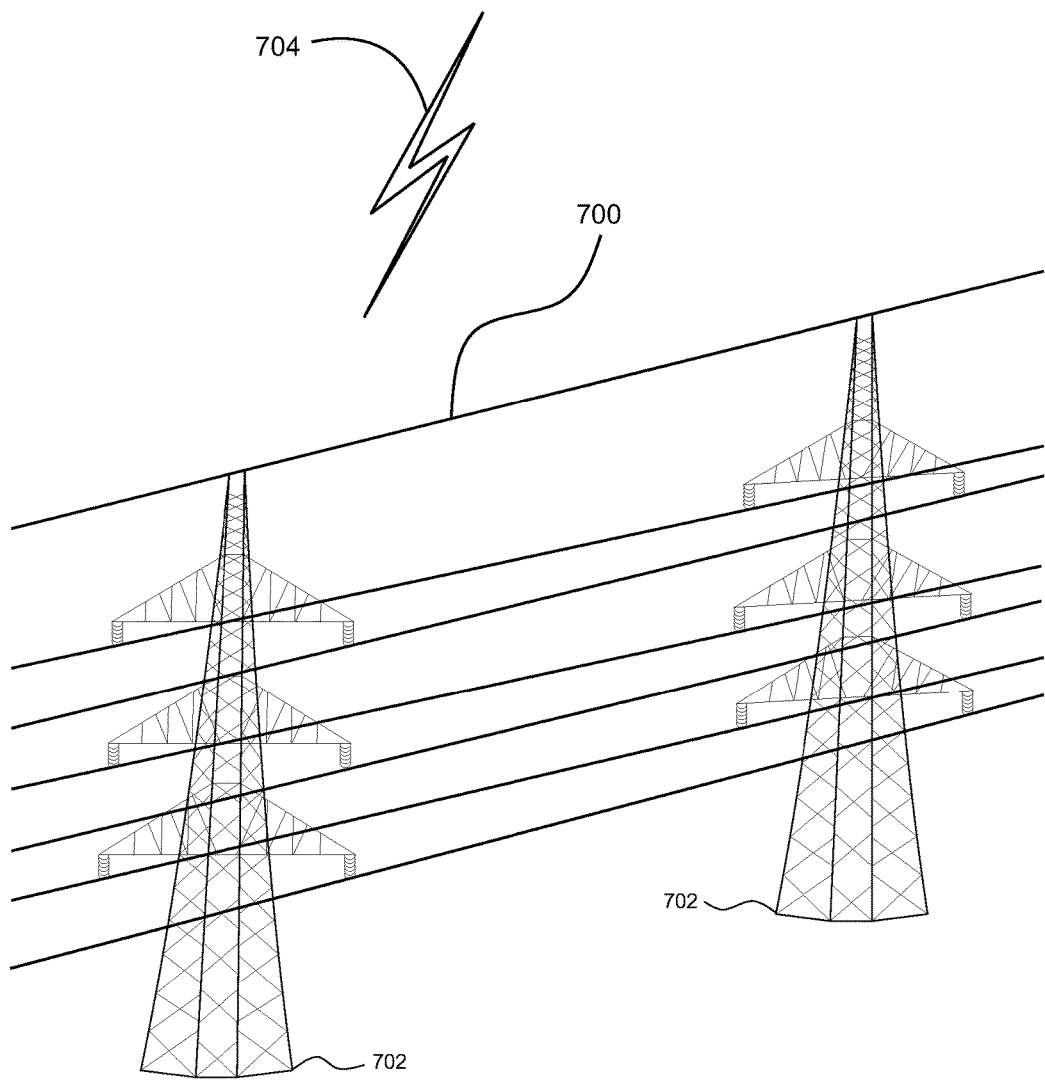
FIG. 7 shows an example OPGW cable suspended atop electric power transmission towers.

FIG. 7 shows an example OPGW cable 700 suspended atop electric power transmission towers 702. The cable 700 is susceptible to lightning strikes, as illustrated by a lightning bolt 704. Lightning coming into contact with the cable 700 causes current to flow in the cable 700. In a typical case of negative lightning, the current is on the order of 30 kiloAmperes (kA). In a typical case of positive lightning, the current is up to about ten times stronger than in a typical case of negative lightning. In both cases, the rise time (also referred to as "transition time") is on the order of single-digit microseconds, for example, in the range of 1 to 5 microseconds.

Although the structure of the cable 700 is not visible in FIG. 7, the cable 700 is constructed of a core element that carries one or more optical fibers, the core element surrounded by N layers of concentric stranded wires, where N is an integer and N≥2. The wires are stranded in a right-hand, CW lay direction in M of the layers, and the wires are stranded in a left-hand, CCW lay direction in the remaining (N−M) layers, where M is an integer, M is less than N, and M≥1.

The optical fibers of the cable 700 can be used for data communications. Information can be encoded using the amplitude, the phase, and the polarization of the light that is propagated through the optical fibers. As explained in more detail below, the current flow in the wire strands of the N layers results in a net magnetic field $B_{\|}^{NET}$ parallel to the direction $\hat{z}$ of light propagation. Due to the Faraday effect, the net magnetic field $B_{\|}^{NET}$ parallel to the direction $\hat{z}$ of light propagation causes a change in the light's state of polarization (SOP). If the magnetic field changes quickly, there will be an equivalent rate of change on the optical signal's SOP. The rotation of the optical signal's SOP, in units of radians, is given by Equation 1:

$$SOP_{delta} = f^2 \times V_t \times L \times B_{\|}^{NET} \quad (1)$$

where f is the optical signal frequency (approximately $193 \times 10^{12}$ Hz), $V_t$ is the Verdet constant (equal to $1.42 \times 10^{-27}$ radians/(meter·Tesla·Hz²)), and L represents the length of the path of the cable 700 through which the lightning current propagates before it is grounded at the tower.

Unexpected changes to the optical signal's SOP, especially high-speed SOP transients that occur when lightning strikes the cable 700, can be disruptive to coherent optical communications and may result in impairments within the coherent optical communications system.

Current Flow in Single Loop Coil and in Helix Wire Strand

Current flowing in a single loop coil (zero pitch) about an axis is perpendicular to the axis, and the magnetic field created by that current flow is parallel to the axis. The strength of that magnetic field within the loop is given by Equation 2:

$$B = \frac{\mu_0 I}{\pi D} \quad (2)$$

where the magnetic permeability $\mu_0$ is a constant equal to $4\pi \times 10^{-7}$ henry per meter, I represents the current flowing in the single loop coil, and $\pi D$ represents the circumference of the single loop coil. If the current flows clockwise about the axis, the resulting magnetic field is in the direction of the axis. If the current flows counter-clockwise about the axis, the resulting magnetic field is opposite to the direction of the axis.

Figure 8:
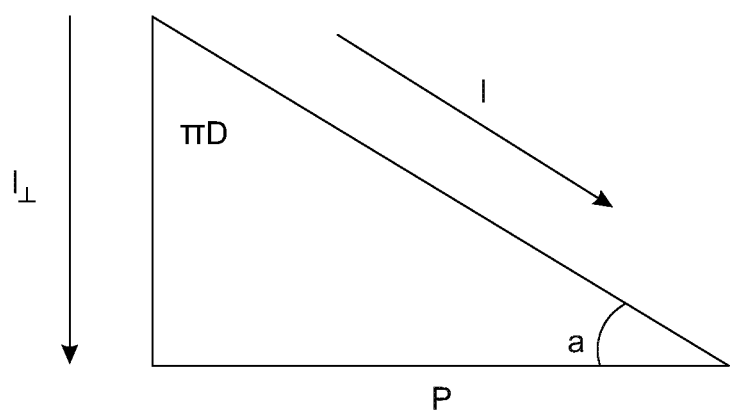
FIG. 8 shows the geometry of a segment of wire strand representing a single coil loop around the cable.

Each wire strand is a helix that can be considered as a partially-unwrapped coil, because there is a non-zero pitch to the helix. FIG. 8 shows a portion of wire strand of a helix of circumference $\pi D$ and pitch p unwound to show trigonometric dimensions. The pitch p is the distance for a wire strand to complete a full turn (single loop) around the core element. An angle $\alpha$ is equal to $\arctan(\pi D/p)$. Current I flows in the wire strand and has a current component $I_\perp$ that is perpendicular to the direction $\hat{z}$ of light propagation. The strength of the current component $I_\perp$ represents the effective current component around a single loop about the axis of the cable, is given by Equation 3:

$$I_\perp = I \times \sin\alpha = I \times \sin(\arctan(\pi D/p)) \quad (3)$$

Current Flow in Core Element and Wire Strands Due to Lightning Strike

Lightning coming into contact with the cable 700 causes current to flow in the core element 102 and in the wire strands of the N layers.

The current in the core element 102 flows parallel to the direction $\hat{z}$ of light propagation in the one or more optical fibers, and therefore the magnetic field created around the core element 102 by that current flow is perpendicular to the direction $\hat{z}$ of light propagation. Consequently, the magnetic field created by the flow of current in the core element 102 has no effect on the polarization state of the light carried by the optical fibers.

As current flows in the wire strands of the N layers, a magnetic field is created around each of the wire strands. The wire strands are not parallel to the direction $\hat{z}$ of light propagation in the one or more optical fibers, and therefore the current flowing in each wire strand has a component $I_\perp$ that is perpendicular to the direction $\hat{z}$ of light propagation. The current component $I_\perp$ that is perpendicular to the direction $\hat{z}$ of light propagation creates a corresponding magnetic field component $B_\parallel$ that is parallel to the direction $\hat{z}$ of light propagation. At the center of the core element, the strength of the magnetic field component $B_\parallel$ that is parallel to the direction $\hat{z}$ of light propagation is given by Equation 4:

$$B_\parallel = \frac{\mu_0 I \times \sin\left(\arctan\left(\frac{\pi D}{p}\right)\right)}{\pi D} \quad (4)$$

Accordingly, current flowing in wire strands of a layer having a left-hand, CCW lay direction will result in a magnetic field component $B_\parallel$ that is parallel to and opposite to the direction $\hat{z}$ of light propagation, and current flowing in wire strands of a layer having a right-hand, CW lay direction will result in a magnetic field component $B_\parallel$ that is parallel to and coincident to the direction $\hat{z}$ of light propagation. Stated differently, the magnetic field components $B_\parallel$ created by the wires stranded in one lay direction counteract the magnetic field components $B_\parallel$ created by the wires stranded in the reverse lay direction.

There is a net magnetic field $B_\parallel^{NET}$ parallel to the direction $\hat{z}$ of light propagation that has contributions from the current flowing in each of the wire strands of the N layers. As explained above, the contributions to the net magnetic field $B_\parallel^{NET}$ due to current flowing in wire strands of a layer having a left-hand, CCW lay direction counteract the contributions to the net magnetic field $B_\parallel^{NET}$ due to current flowing in wire strands of a layer having a right-hand, CW lay direction.

The net magnetic field $B_\parallel^{NET}$ parallel to the direction $\hat{z}$ of light propagation can be expressed as a sum of contributions as given by Equation 5:

$$B_\parallel^{NET} = \sum_{layer=1}^{N} \alpha_{layer} B_{layer} \quad (5)$$

where each of the N layers in the cable contributes a corresponding $B_{layer}$ to the net magnetic field $B_\parallel^{NET}$, with a corresponding coefficient $\alpha_{layer}$ that is equal to $+1$ for one lay direction (e.g. the right-hand, CW lay direction) and that is equal to $-1$ for the reverse lay direction (e.g. the left-hand, CCW lay direction).

For the cable illustrated in FIG. 1, Equation 5 becomes $B_\parallel^{NET} = B_1 - B_2$. For the cable illustrated in FIG. 2, Equation 5 becomes $B_\parallel^{NET} = -B_1 + B_2$. For the cable illustrated in FIG. 3, Equation 5 becomes $B_\parallel^{NET} = -B_1 + B_2 - B_3$. For the cable illustrated in FIG. 4, Equation 5 becomes $B_\parallel^{NET} = -B_1 - B_2 + B_3$. For the cable illustrated in FIG. 5, Equation 5 becomes $B_\parallel^{NET} = B_1 - B_2 + B_3 - B_4$. For the cable illustrated in FIG. 6, Equation 5 becomes $B_\parallel^{NET} = B_1 - B_2 - B_3 + B_4$.

Mechanical Structure of OPGW Cable Affects Net Magnetic Field $B_\parallel^{NET}$ This document proposes new OPGW cable structures designed to reduce or minimize the net magnetic field $B_\parallel^{NET}$ parallel to the direction $\hat{z}$ of light propagation resulting from a lightning strike on the cable. A reduction in the net magnetic field $B_\parallel^{NET}$ parallel to the direction $\hat{z}$ of light propagation yields a reduction in the amount and speed of SOP rotation resulting from a lightning strike on the cable due to the Faraday effect.

OPGW cables according to the new OPGW cable structures are constructed of a core element that carries one or more optical fibers, the core element surrounded by N layers of concentric stranded wires, where N is an integer and $N \geq 2$. The wires are stranded in a right-hand, CW lay direction in M of the layers, and the wires are stranded in a left-hand, CCW lay direction in the remaining (N−M) layers, where M is an integer, M is less than N, and $M \geq 1$.

The reduction or minimization of the net magnetic field Br is achieved by designing the new OPGW structure to balance or equalize total contributions to the net magnetic field $B_\parallel^{NET}$ from the M layers whose wires are stranded in the right-hand, CW lay direction and total contributions to the net magnetic field $B_\parallel^{NET}$ from the remaining (N−M) layers whose wires are stranded in the left-hand, CCW lay direction.

Equation 5 can be rewritten as given in Equation 6:

$$B_\parallel^{NET} = \sum_{\substack{CW\ layer=1 \\ wires\ stranded \\ in\ CW\ layer\ direction}}^{M} B_{CW\ layer} - \sum_{\substack{CCW\ layer=N-M+1 \\ wires\ stranded \\ in\ CCW\ layer\ direction}}^{M} B_{CCW\ layer} \quad (6)$$

To balance or equalize the contributions, the new OPGW structure should aim to have the first sum in Equation 6 equal to the second sum in Equation 6. This balance or equalization of contributions is possible because the wire strands comprise wire strands of different electrical conductivity $\kappa$. Wire strands having relatively higher electrical conductivity $\kappa$ will contribute more to the net magnetic field $B_\parallel^{NET}$ than wire strands having relatively lower electrical conductivity κ. The greater the difference in electrical conductivity κ, the greater the difference in contribution to the net magnetic field $B_\parallel^{NET}$.

A non-exhaustive list of example materials from which relatively high-κ wire can be constructed includes aluminum, aluminum alloy, copper, and copper alloy. A non-exhaustive list of example materials from which relatively low-κ wire can be constructed includes steel and aluminum-clad steel. For example, the cable may use aluminum strands and stainless steel strands. The resistivity of stainless steel is $6.3 \times 10^{-7}$ ohm-m, and the resistivity of aluminum is $2.8 \times 10^{-8}$ ohm-m, the resistivity of copper is $1.68 \times 10^{-8}$ ohm-m. Thus aluminum is about 22 times more electrically conductive than steel. Stated differently, the electrical conductivity of aluminum is much greater than the electrical conductivity of stainless steel: $\kappa_{Al} \ggg \kappa_{steel}$.

A new OPGW cable structure, referred to in this document as a "roughly-balanced OPGW cable" is proposed. A roughly-balanced OPGW cable is constructed of a core element that carries one or more optical fibers, the core element surrounded by N layers of concentric stranded wires, where N is an integer and N≥2. The wires are stranded in a right-hand, CW lay direction in M of the layers, and the wires are stranded in a left-hand, CCW lay direction in the remaining (N−M) layers, where M is an integer, M is less than N, and M≥1. The cable is "roughly balanced" in that the number of relatively high-κ wires stranded in the right-hand, CW lay direction (which is the total number of strands of relatively high-κ wires in the M layers) is equal to the number of relatively high-κ wires stranded in the left-hand, CCW lay direction (which is the total number of strands of relatively high-κ wires in the remaining (N−M) layers). However, the first sum in Equation 6 is likely not equal to the second sum in Equation 6 because there are contributions to the magnetic field from the relatively low-κ wires, and because the magnetic field contributions are affected by diameter and pitch of the helix structures of the layers.

Another new OPGW cable structure, referred to in this document as a "low-κ adjusted roughly-balanced OPGW cable" is proposed. A low-κ adjusted roughly-balanced OPGW cable is constructed of a core element that carries one or more optical fibers, the core element surrounded by N layers of concentric stranded wires, where N is an integer and N≥2. The wires are stranded in a right-hand, CW lay direction in M of the layers, and the wires are stranded in a left-hand, CCW lay direction in the remaining (N−M) layers, where M is an integer, M is less than N, and M≥1. The cable is "roughly balanced" in that the number of relatively high-κ wires stranded in the right-hand, CW lay direction (which is the total number of strands of relatively high-κ wires in the M layers) is equal to the number of relatively high-κ wires stranded in the left-hand, CCW lay direction (which is the total number of strands of relatively high-κ wires in the remaining (N−M) layers). The cable is "low-κ adjusted" in that the number of relatively low-K wires in one or more of the layers is adjusted so as to better balance or equalize total contributions to the net magnetic field $B_\parallel^{NET}$ from the M layers whose wires are stranded in the right-hand, CW lay direction and total contributions to the net magnetic field $B_\parallel^{NET}$ from the remaining (N−M) layers whose wires are stranded in the left-hand, CCW lay direction.

A further new OPGW cable structure, referred to in this document as a "pitch-adjusted roughly-balanced OPGW cable" is proposed. A pitch-adjusted roughly-balanced OPGW cable is constructed of a core element that carries one or more optical fibers, the core element surrounded by N layers of concentric stranded wires, where N is an integer and N≥2. The wires are stranded in a right-hand, CW lay direction in M of the layers, and the wires are stranded in a left-hand, CCW lay direction in the remaining (N−M) layers, where M is an integer, M is less than N, and M≥1. The cable is "roughly balanced" in that the number of relatively high-κ wires stranded in the right-hand, CW lay direction (which is the total number of strands of relatively high-κ wires in the M layers) is equal to the number of relatively high-κ wires stranded in the left-hand, CCW lay direction (which is the total number of strands of relatively high-κ wires in the remaining (N−M) layers). The cable is "pitch-adjusted" in that the pitch of one or more of the layers is adjusted so as to better balance or equalize total contributions to the net magnetic field $B_\parallel^{NET}$ from the M layers whose wires are stranded in the right-hand, CW lay direction and total contributions to the net magnetic field $B_\parallel^{NET}$ from the remaining (N−M) layers whose wires are stranded in the left-hand, CCW lay direction.

A further new OPGW cable structure, referred to in this document as a "low-κ adjusted pitch-adjusted roughly-balanced OPGW cable" is proposed. A low-κ adjusted pitch-adjusted roughly-balanced OPGW cable is constructed of a core element that carries one or more optical fibers, the core element surrounded by N layers of concentric stranded wires, where N is an integer and N≥2. The wires are stranded in a right-hand, CW lay direction in M of the layers, and the wires are stranded in a left-hand, CCW lay direction in the remaining (N−M) layers, where M is an integer, M is less than N, and M≥1. The cable is "roughly balanced" in that the number of relatively high-κ wires stranded in the right-hand, CW lay direction (which is the total number of strands of relatively high-κ wires in the M layers) is equal to the number of relatively high-K wires stranded in the left-hand, CCW lay direction (which is the total number of strands of relatively high-κ wires in the remaining (N−M) layers). The cable is "low-κ adjusted" in that the number of relatively low-κ wires in one or more of the layers is adjusted so as to better balance or equalize total contributions to the net magnetic field $B_\parallel^{NET}$ from the M layers whose wires are stranded in the right-hand, CW lay direction and total contributions to the net magnetic field $B_\parallel^{NET}$ from the remaining (N−M) layers whose wires are stranded in the left-hand, CCW lay direction. The cable is "pitch-adjusted" in that the pitch of one or more of the layers is adjusted so as to better balance or equalize total contributions to the net magnetic field $B_\parallel^{NET}$ from the M layers whose wires are stranded in the right-hand, CW lay direction and total contributions to the net magnetic field $B_\parallel^{NET}$ from the remaining (N−M) layers whose wires are stranded in the left-hand, CCW lay direction.

Specific Examples for 2-Layer OPGW Cables

These concepts will now be demonstrated with specific examples of 2-layer OPGW cables, such as illustrated in FIG. 1 and FIG. 2. It will be obvious to a person of ordinary skill in the art how to adapt the following discussion for OPGW cables having more than two layers. Going forward, the first layer 106 will be referred to as "the inner layer 106" and the second layer 108 will be referred to as "the outer layer 108".

In a 2-layer OPGW cable, Equation 1 is rewritten as $$SOP_{delta} = f^2 \times V_t \times L\lambda (B_{outer} - B_{inner}) \qquad (7)$$

where the "outer" magnetic field $B_{outer}$ parallel to the direction $\hat{z}$ of light propagation is contributed by the outer layer 108 and the "inner" magnetic field $B_{inner}$ parallel to the direction $\hat{z}$ of light propagation is contributed by the inner layer 106.

Ideally, the outer magnetic field $B_{outer}$ is equal to the inner magnetic field $B_{inner}$, so that the net magnetic field $B_{\parallel}^{NET}$ parallel to the direction $\hat{z}$ of light propagation is equal to zero. Using Equation 4, this means:

$$\mu_0 I_{outer} \times \frac{\sin\left(\arctan\left(\frac{\pi D_{outer}}{p_{outer}}\right)\right)}{\pi D_{outer}} = \mu_0 I_{inner} \times \frac{\sin\left(\arctan\left(\frac{\pi D_{inner}}{p_{inner}}\right)\right)}{\pi D_{inner}} \quad (8)$$

which can be simplified and rearranged as Equation 9:

$$\frac{I_{outer}}{I_{inner}} = \frac{D_{outer}}{D_{inner}} \times \frac{\sin\left(\arctan\left(\frac{\pi D_{inner}}{p_{inner}}\right)\right)}{\sin\left(\arctan\left(\frac{\pi D_{outer}}{p_{outer}}\right)\right)} \quad (9)$$

Equation 9 is an expression of an ideal relationship between various factors that affect the net magnetic field $B_{\parallel}^{NET}$ parallel to the direction $\hat{z}$ of light propagation. When these factors (the diameter $D_{inner}$ of the inner helix structure, the diameter $D_{outer}$ of the outer helix structure, the pitch $p_{inner}$ of the inner helix structure, the pitch $p_{outer}$ of the outer helix structure, the current $I_{inner}$ flowing in the wires of the inner layer, and the current $I_{outer}$ flowing in the wires of the outer layer) satisfy the relationship of Equation 9, then the net magnetic field $B_{\parallel}^{NET}$ parallel to the direction $\hat{z}$ of light propagation is minimized.

The actual ratio $I_{outer}/I_{inner}$ of the currents is given by the ratio of the combined resistivity of the strands of the inner layer to the combined resistivity of the strands of the outer layer. Most of the contribution to the currents comes from the strands of relatively high-κ wire, in cases where the electrical conductivity of the relatively high-κ wire is significantly greater than the electrical conductivity of the relatively low-κ wire. For example, aluminum is about 22 times more electrically conductive than steel. The actual ratio $I_{outer}/I_{inner}$ of the currents can be controlled (on a coarse scale) by determining how many strands of relatively high-κ wire are in the outer layer versus the inner layer. The actual ratio $I_{outer}/I_{inner}$ of the currents can be further controlled (on a finer scale) by determining the number of strands of the relatively low-κ wire in the outer layer versus the inner layer. The total number of strands of relatively high-κ wire and of strands of relatively low-κ wire is also subject to electrical conductivity and mechanical/tensile strength engineering requirements for the OPGW cable.

The diameter $D_{inner}$ of the inner helix structure and the diameter $D_{outer}$ of the outer helix structure are largely determined by the gauge of the wire used and by the diameter of the core element and therefore are not easily controlled. One can consider the diameters to be predetermined.

The pitch $p_{inner}$ of the inner helix structure and the pitch $p_{outer}$ of the outer helix structure should be manufacturing variables that can be customized, within reason, allowing some fine tuning of the net magnetic field $B_{\parallel}^{NET}$ parallel to the direction $\hat{z}$ of light propagation.

Ideal Current Ratio

For fixed values of the diameters and the pitches, Equation 9 is an expression of an ideal ratio of currents ("ideal current ratio") between the outer layer of wire strands and the inner layer of wire strands.

The new OPGW cable structures proposed in this document achieve, for a 2-layer OPGW cable, that an actual ratio of an outer current $I_{outer}$ in the wires of the outer layer to an inner current $I_{inner}$ in the wires of the inner layer is within 10 percent of an ideal ratio of the outer current $I_{outer}$ to the inner current $I_{inner}$, where the actual ratio is calculated as a ratio of combined resistivity of the strands of the inner layer to combined resistivity of the strands of the outer layer, and the ideal ratio is calculated per Equation 9.

For an OPGW cable having outer diameter $D_{outer}=0.016$ m, outer pitch $p_{outer}=0.2$ m, inner diameter $D_{inner}=0.011$ m, and inner pitch $p_{inner}=0.2$ m, the ideal current ratio can be calculated by substituting the numerical values of the diameters and the pitches into Equation 9, yielding the approximate ideal current ratio 1.016 as shown in Equation 10:

$$\left(\frac{I_{outer}}{I_{inner}}\right)^{IDEAL} = 1.\overline{45} \times \frac{\sin\left(\arctan\left(\frac{\pi}{18.\overline{18}}\right)\right)}{\sin\left(\arctan\left(\frac{\pi}{12.5}\right)\right)} \approx 1.016 \quad (10)$$

As explained above, the balance or equalization of contributions to the net magnetic field $B_{\parallel}^{NET}$ parallel to the direction $\hat{z}$ of light propagation from the layer whose wires are stranded in one lay direction to contributions from the layer whose wires are stranded in the reverse lay direction is possible because the wire strands comprise wire strands of different electrical conductivity.

This is evident from a comparison of a conventional OPGW cable having all of the strands of relatively high-κ wire in its outer layer to a proposed 2-layer roughly-balanced OPGW cable having equal numbers of strands of relatively high-κ wire in its inner layer and its outer layer.

Example 1) 2-Layer Conventional 30-Strand OPGW Cable

Figure 9:
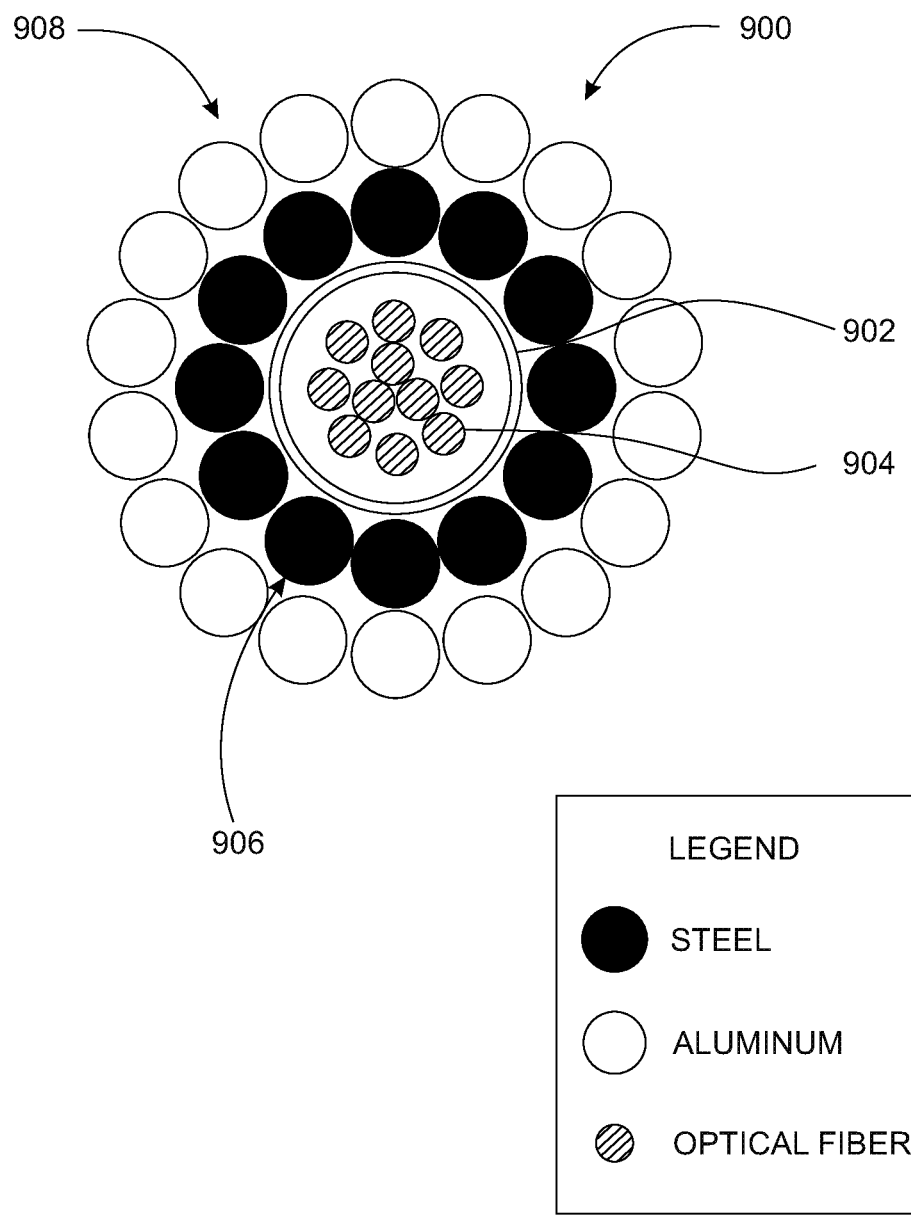
FIG. 9 (PRIOR ART) shows a cross-section of an example 2-layer conventional 30-strand OPGW cable, having all of its strands of high electrical conductivity wire in its outer layer.

A specific example of a conventional OPGW cable, referred to in this document as "the example 2-layer conventional 30-strand OPGW cable", is illustrated in FIG. 9 (PRIOR ART) and meets the following specifications:
  30 strands of wire, all same wire gauge
  Outer layer: 18 strands of aluminum, diameter $D_{outer}=0.016$ m, pitch $p_{outer}=0.2$ m
  Inner layer: 12 strands of steel, diameter $D_{inner}=0.011$ m, pitch $p_{inner}=0.2$ m FIG. 9 (PRIOR ART) shows a cross-section of an example OPGW cable 900. The cable 900 is constructed of a core element 902 that carries one or more optical fibers 904, an inner layer 906 composed of 12 steel strands, and an outer layer 908 composed of 18 aluminum strands. All aluminum strands are located in the outer layer 908. No aluminum strands are located in the inner layer 906.

The actual ratio $I_{outer}/I_{inner}$ of the currents in the cable 900 can be calculated as follows:

$$\left(\frac{I_{outer}}{I_{inner}}\right)^{ACTUAL} = \frac{\text{combined resistivity of 12 steel strands}}{\text{combined resistivity of 18 Al strands}} = \quad (11)$$

$$\frac{12 \times 6.3 \times 10^{-7}}{18 \times 2.8 \times 10^{-8}} = \frac{756}{50.4} = 15$$

Clearly the actual ratio of the currents in the cable 900 is far larger than the approximate ideal current ratio 1.016.

Example 2) 2-Layer Roughly-Balanced 30-Strand OPGW Cable

Figure 10:
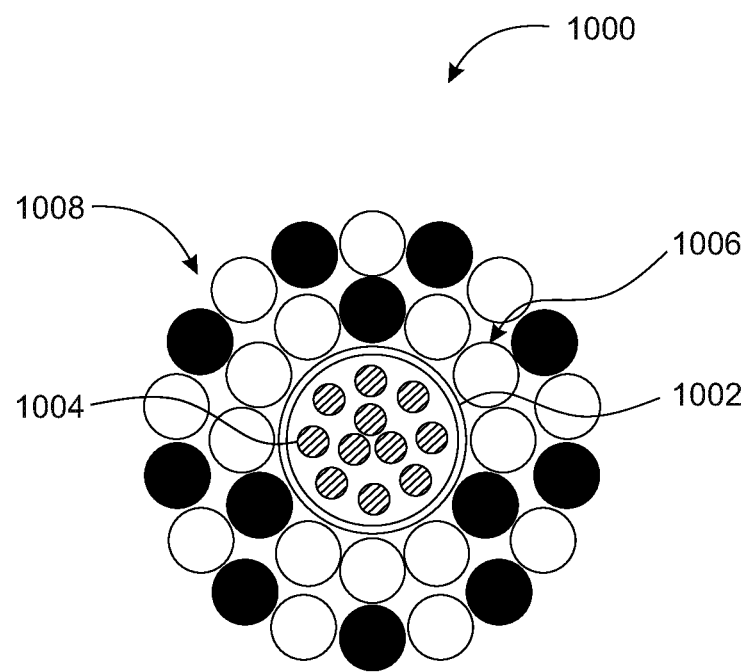
FIG. 10 shows a cross-section of an example roughly-balanced 30-strand OPGW cable, having an equal number of strands of high electrical conductivity wire in its inner layer and in its outer layer.
Figure 10:
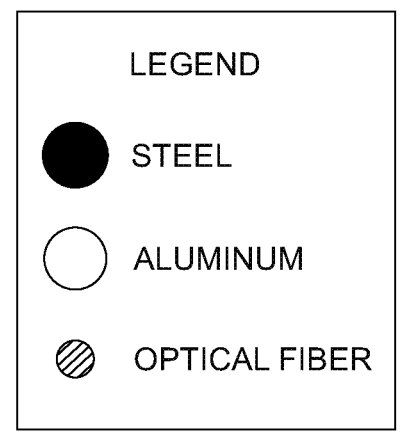

A specific example of the roughly-balanced OPGW cable, referred to in this document as "the example 2-layer roughly-balanced 30-strand OPGW cable", meets the following specifications:
- 30 strands of wire, all same wire gauge
- 12 strands of steel required for tensile strength
- Outer layer: 9 strands of aluminum, 9 strands of steel, diameter $D_{outer}$=0.016 m, pitch $p_{outer}$=0.2 m
- Inner layer: 9 strands of aluminum, 3 strands of steel, diameter $D_{inner}$=0.011 m, pitch $p_{inner}$=0.2 m FIG. 10 shows a cross-section of an example OPGW cable 1000. The cable 1000 is constructed of a core element 1002 that carries one or more optical fibers 1004, an inner layer 1006 composed of 3 steel strands and 9 aluminum strands, and an outer layer 1008 composed of 9 steel strands and 9 aluminum strands. An equal number of aluminum strands are located in the inner layer 1006 and in the outer layer 1008.

The actual ratio $I_{outer}/I_{inner}$ of the currents in the cable 1000 can be calculated as follows:

$$\left(\frac{I_{outer}}{I_{inner}}\right)^{ACTUAL} = \frac{\text{combined resistivity of 9 Al strands and 3 steel strands}}{\text{combined resistivity of 9 Al strands and 9 steel strands}} = \frac{0.307 \times 10^{-8}}{0.297 \times 10^{-8}} = \frac{30.7}{29.7} = 1.034 \quad (12)$$

What Equation 12 demonstrates is that by allocating equal numbers of the aluminum strands to the inner layer 1006 and to the outer layer 1008, the actual ratio $I_{outer}/I_{inner}$ of the currents becomes close to the "ideal current ratio" (in this case, within about 2% of the approximate ideal current ratio 1.016).

Example 3) 2-Layer Low-κ Adjusted Roughly-Balanced 27-Strand OPGW Cable

Figure 11:
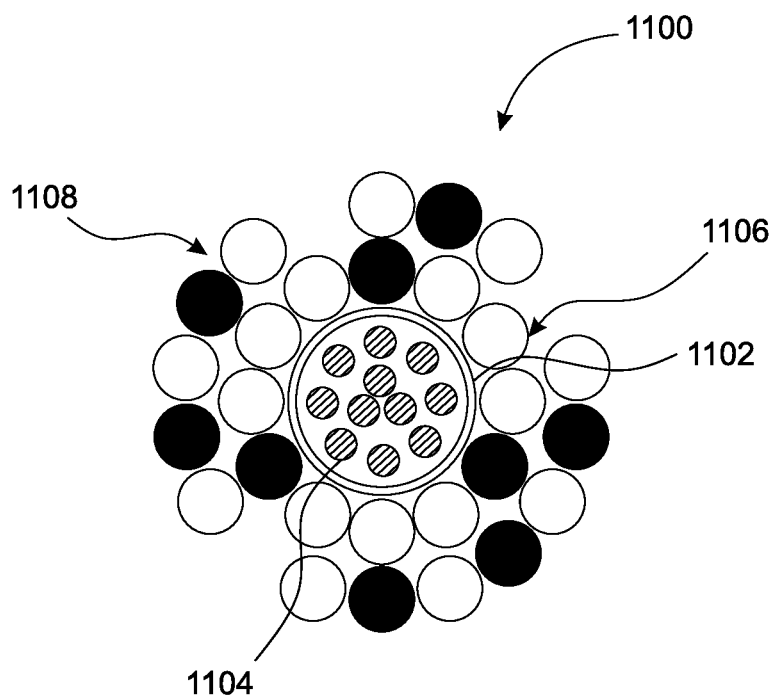
FIG. 11 shows a cross-section of an example low-κ adjusted roughly-balanced OPGW cable, having an equal number of strands of high electrical conductivity wire in its inner layer and in its outer layer.
Figure 11:
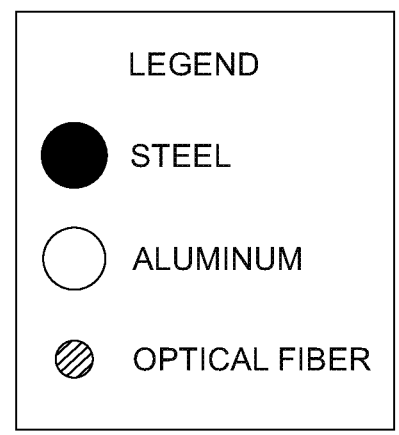

A specific example of the low-κ adjusted roughly-balanced OPGW cable, referred to in this document as "the example 2-layer roughly-balanced 27-strand OPGW cable", meets the following specifications:
- 27 strands of wire, all same wire gauge
- 9 strands of steel required for tensile strength
- Outer layer: 9 strands of aluminum, 6 strands of steel, diameter $D_{outer}$=0.016 m, pitch $p_{outer}$=0.2 m
- Inner layer: 9 strands of aluminum, 3 strands of steel, diameter $D_{inner}$=0.011 m, pitch $p_{inner}$=0.2 m FIG. 11 shows a cross-section of an example cable 1100. The cable 1100 is constructed of a core element 1102 that carries one or more optical fibers 1104, an inner layer 1106 composed of 3 steel strands and 9 aluminum strands, and an outer layer 1108 composed of 6 steel strands and 9 aluminum strands. An equal number of aluminum strands are located in the inner layer 1106 and in the outer layer 1108.

The cable 1100 differs from the cable 1000 (Example 2) in that the cable 1100 has 3 fewer strands of steel in its outer layer 1108.

The actual ratio $I_{outer}/I_{inner}$ of the currents in the cable 1100 can be calculated as follows:

$$\left(\frac{I_{outer}}{I_{inner}}\right)^{ACTUAL} = \frac{\text{combined resistivity of 9 Al strands and 3 steel strands}}{\text{combined resistivity of 9 Al strands and 6 steel strands}} = \frac{0.307 \times 10^{-8}}{0.302 \times 10^{-8}} = \frac{30.7}{30.2} = 1.0166 \quad (13)$$

What Equation 13 demonstrates is that by allocating equal numbers of aluminum strands to the inner layer 1106 and to the outer layer 1108, and by having fewer steel strands from the outer layer 1108, the actual ratio $I_{outer}/I_{inner}$ of the currents becomes very close to the "ideal current ratio".

Example 4) 2-Layer Pitch-Adjusted Roughly-Balanced 30-Strand OPGW Cable

A specific example of the pitch-adjusted roughly-balanced OPGW cable, referred to in this document as "the example 2-layer pitch-adjusted roughly-balanced 30-strand OPGW cable", meets the following specifications:
- 30 strands of wire, all same wire gauge
- 12 strands of steel required for tensile strength
- Outer layer: 9 strands of aluminum, 9 strands of steel, diameter $D_{outer}$=0.016 m, pitch $p_{outer}$=0.2 m
- Inner layer: 9 strands of aluminum, 3 strands of steel, diameter $D_{inner}$=0.011 m, pitch $p_{inner}$=0.1965 m The example 2-layer pitch-adjusted roughly-balanced 30-strand OPGW cable differs from the example 2-layer roughly-balanced 30-strand OPGW cable (Example 3) in that the inner pitch has been shortened by 3.5 mm. Substituting the numerical values of the diameters and the pitches into Equation 9 yields a revised approximate ideal current ratio 1.0336 as shown in Equation 14:

$$\left(\frac{I_{outer}}{I_{inner}}\right)^{IDEAL} = 1.\overline{45} \times \frac{\sin\left(\arctan\left(\frac{\pi}{17.8636}\right)\right)}{\sin\left(\arctan\left(\frac{\pi}{12.5}\right)\right)} \approx 1.0336 \quad (14)$$

What Equation 14 demonstrates is that by selecting an appropriate inner pitch, the "ideal current ratio" can be made to be nearly identical to the actual ratio $I_{outer}/I_{inner}$ of the currents, which was calculated in Equation 12 to be equal to 1.034.

The appropriate inner pitch can be calculated by isolating the inner pitch $p_{inner}$ in Equation 9 to arrive at Equation 15:

$$p_{inner} = \frac{\pi D_{inner}}{\tan\left(\arcsin\left[\frac{D_{inner}}{D_{outer}} \times \left(\frac{I_{outer}}{I_{inner}}\right)^{ACTUAL} \times \sin\left(\arctan\left(\frac{\pi D_{outer}}{p_{outer}}\right)\right)\right]\right)} \quad (15)$$

and then substituting the numerical values of the diameters, the outer pitch $p_{outer}$, and the actual ratio $I_{outer}/I_{inner}$ of the currents (calculated as the ratio of the combined resistivity of the strands of the inner layer to the combined resistivity of the strands of the outer layer).

In an alternative implementation, the inner pitch may be considered fixed, and the appropriate outer pitch that makes the "ideal current ratio" nearly identical to the actual ratio $I_{outer}/I_{inner}$ of the currents can be calculated isolating the outer pitch $p_{outer}$ in Equation 9 to arrive at Equation 16:

$$p_{outer} = \frac{\pi D_{outer}}{\tan\left[\arcsin\left[\frac{\frac{D_{outer}}{D_{inner}} \times \sin\left(\arctan\left(\frac{\pi D_{inner}}{p_{inner}}\right)\right)}{\left(\frac{I_{outer}}{I_{inner}}\right)^{ACTUAL}}\right]\right]} \quad (16)$$

and then substituting the numerical values of the diameters, the inner pitch $p_{inner}$, and the actual ratio $I_{outer}/I_{inner}$ of the currents (calculated as the ratio of the combined resistivity of the strands of the inner layer to the combined resistivity of the strands of the outer layer).

Specific Examples for 4-Layer OPGW Cables

These concepts will now be demonstrated with specific examples of 4-layer OPGW cables, such as illustrated in FIG. 5 and FIG. 6.

Example 5) 4-Layer 84-Strand OPGW Cable

Figure 12:
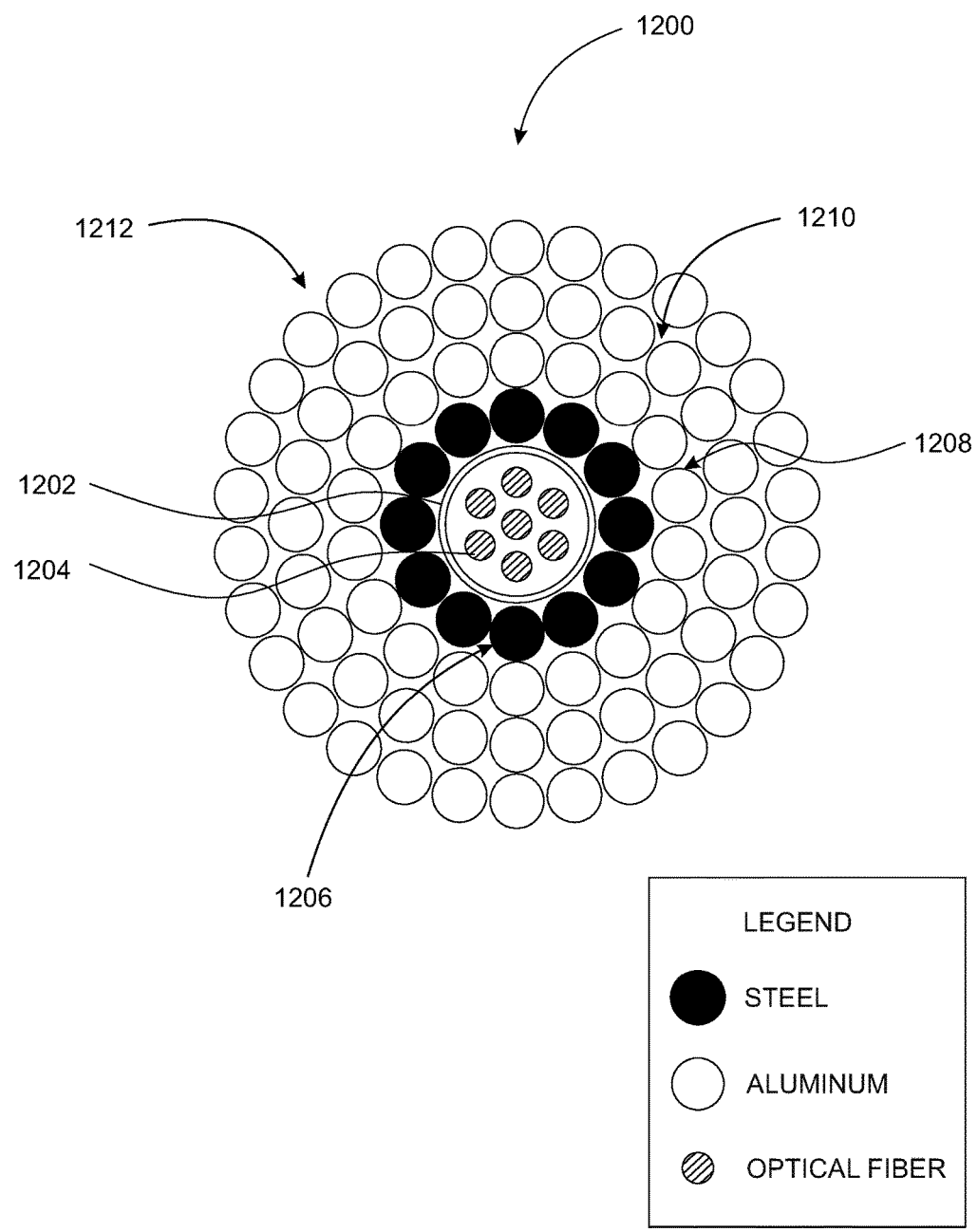
FIG. 12 shows a cross-section of an example 4-layer 84-strand OPGW cable, having all of its strands of high electrical conductivity wire in its outer three layers.

A specific example of an OPGW cable, referred to in this document as "the example 4-layer 84-strand OPGW cable", is illustrated in FIG. 12 and meets the following specifications:
- 84 strands of wire, all same wire gauge
- 12 strands of steel required for tensile strength
- Layer 1 (stranded in a right-hand, CW direction): 12 strands of steel, diameter $D_1$=0.011 m, pitch $p_1$=0.2 m
- Layer 2 (stranded in a left-hand, CCW lay direction): 18 strands of aluminum, diameter $D_2$=0.016 m, pitch $p_2$=0.2 m
- Layer 3 (stranded in a right-hand, CW direction): 24 strands of aluminum, diameter $D_3$=0.021 m, pitch $p_3$=0.2 m
- Layer 4 (stranded in a left-hand, CCW lay direction): 30 strands of aluminum, diameter $D_4$=0.026 m, pitch $p_4$=0.2 m FIG. 12 shows a cross-section of an example cable 1200. The cable 1200 is constructed of a core element 1202 that carries one or more optical fibers 1204, a first layer 1206 composed of 12 steel strands, a second layer 1208 composed of 18 aluminum strands, a third layer 1210 composed of 24 aluminum strands, and a fourth layer 1212 composed of 30 aluminum strands. No aluminum strands are located in the innermost first layer 1206.

The resistivity of the first layer 1206 is given by the combined resistivity of 12 steel strands. The resistivity of the second layer 1208 is given by the combined resistivity of 18 Al strands. The resistivity of the third layer 1210 is given by the combined resistivity of 24 Al strands. The resistivity of the fourth layer 1212 is given by the combined resistivity of 30 Al strands. The total resistivity of the OPGW cable 1200 is the resistivity of all layers combined in parallel. The proportion of the current that would flow in each layer is based on the inverse ratio of a given layer's resistivity to the total resistivity of the OPGW cable 1200.

Figure 13:
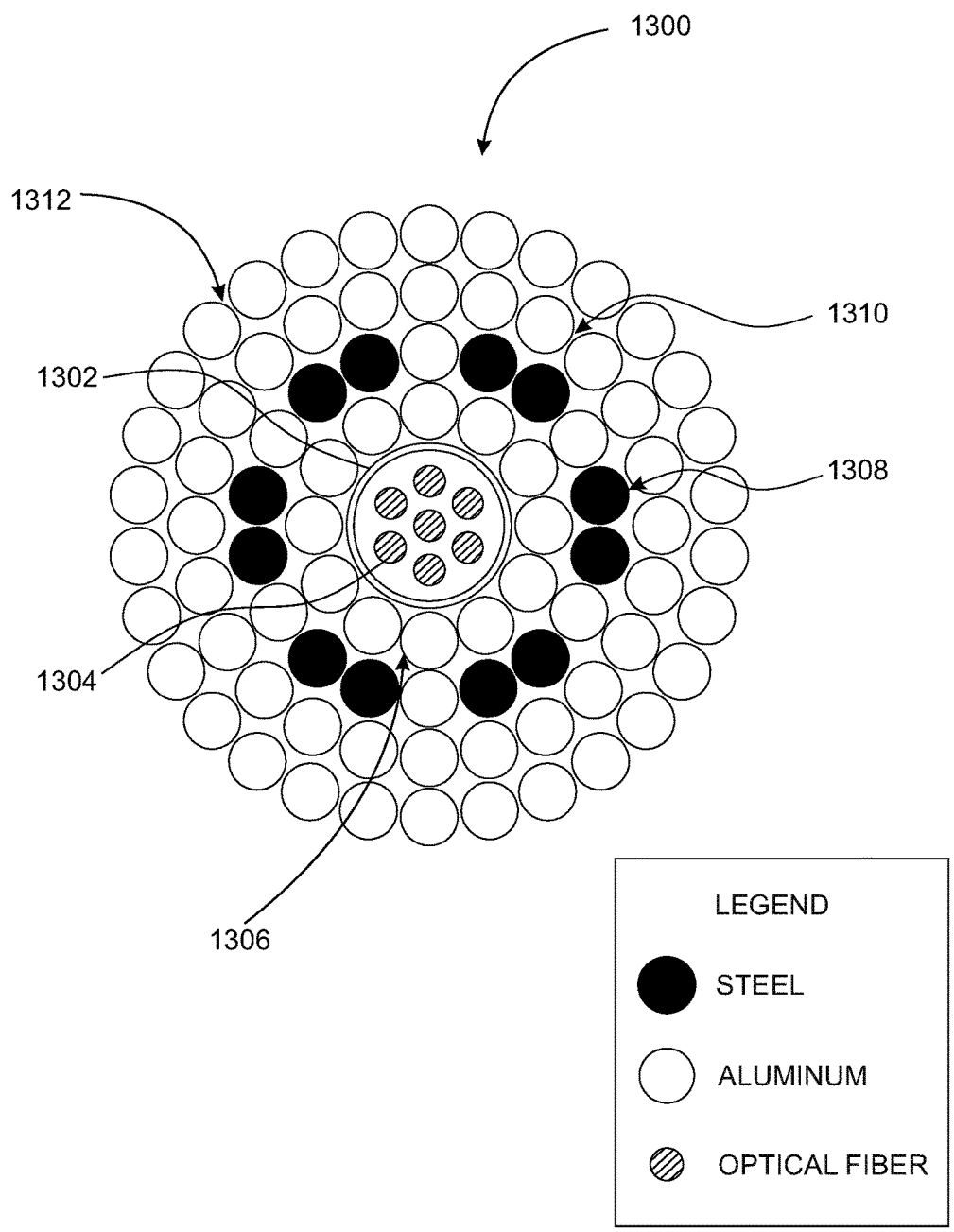
FIG. 13 shows a cross-section of an example roughly-balanced 84-strand OPGW cable with alternately reversed lay direction stranding, having equal numbers of strands of high electrical conductivity wire in its clockwise stranded layers and in its counter-clockwise stranded layers.

Example 6) 4-Layer Roughly-Balanced 84-Strand OPGW Cable with Alternately Reversed Lay Direction Stranding A specific example of a roughly-balanced OPGW cable, referred to in this document as "the example 4-layer roughly-balanced 84-strand OPGW cable with alternately reversed lay direction stranding", is illustrated in FIG. 13 and meets the following specifications:
- 84 strands of wire, all same wire gauge
- 12 strands of steel required for tensile strength
- Layer 1 (stranded in a right-hand, CW direction): 12 strands of aluminum, diameter $D_1$=0.011 m, pitch $p_1$=0.2 m
- Layer 2 (stranded in a left-hand, CCW lay direction): 6 strands of aluminum, 12 strands of steel, diameter $D_2$=0.016 m, pitch $p_2$=0.2 m
- Layer 3 (stranded in a right-hand, CW direction): 24 strands of aluminum, diameter $D_3$=0.021 m, pitch $p_3$=0.2 m
- Layer 4 (stranded in a left-hand, CCW lay direction): 30 strands of aluminum, diameter $D_4$=0.026 m, pitch $p_4$=0.2 m FIG. 13 shows a cross-section of an example cable 1300 with alternately reversed lay direction stranding. The cable 1300 is constructed of a core element 1302 that carries one or more optical fibers 1304, a first layer 1306 composed of 12 aluminum strands, a second layer 1308 composed of 6 aluminum strands and 12 steel strands, a third layer 1310 composed of 24 aluminum strands, and a fourth layer 1312 composed of 30 aluminum strands. The cable is "roughly balanced" in that the number of aluminum wires stranded in the right-hand, CW lay direction (12 Al strands from Layer 1 and 24 Al strands from Layer 3) is equal to the number of aluminum wires stranded in the left-hand, CCW lay direction (6 Al strands from Layer 2 and 30 Al strands from Layer 4).

The resistivity of the first layer 1306 is given by the combined resistivity of 12 Al strands. The resistivity of the second layer 1308 is given by the combined resistivity of 6 Al strands and 12 steel strands. The resistivity of the third layer 1310 is given by the combined resistivity of 24 Al strands. The resistivity of the fourth layer 1312 is given by the combined resistivity of 30 Al strands. The total resistivity of the OPGW cable 1300 is the resistivity of all layers combined in parallel. The proportion of the current that would flow in each layer is based on the inverse ratio of a given layer's resistivity to the total resistivity of the OPGW cable 1300.

Example 7) 4-Layer Pitch-Adjusted Roughly-Balanced 84-Strand OPGW Cable with Alternately Reversed Lay Direction Stranding A specific example of a pitch-adjusted roughly-balanced OPGW cable, referred to in this document as "the example 4-layer pitch-adjusted roughly-balanced 84-strand OPGW cable with alternately reversed lay direction stranding", meets the following specifications:
- 84 strands of wire, all same wire gauge
- 12 strands of steel required for tensile strength
- Layer 1 (stranded in a right-hand, CW direction): 12 strands of aluminum, diameter $D_1$=0.011 m, pitch $p_1$=0.21 m
- Layer 2 (stranded in a left-hand, CCW lay direction): 6 strands of aluminum, 12 strands of steel, diameter $D_2$=0.016 m, pitch $p_2$=0.2 m
- Layer 3 (stranded in a left-hand, CW direction): 24 strands of aluminum, diameter $D_3$=0.021 m, pitch $p_3$=0.2 m Layer 4 (stranded in a right-hand, CCW lay direction): 30 strands of aluminum, diameter $D_4$=0.026 m, pitch $p_4$=0.2 m The example 4-layer pitch-adjusted roughly-balanced 84-strand OPGW cable with alternately reversed lay direction stranding differs from the 4-layer roughly-balanced 84-strand OPGW cable (Example 6) with alternately reversed lay direction stranding in that pitch of layer 1 has been lengthened by 10 mm.

Example 8) 4-Layer Roughly-Balanced 84-Strand OPGW Cable

Figure 14:
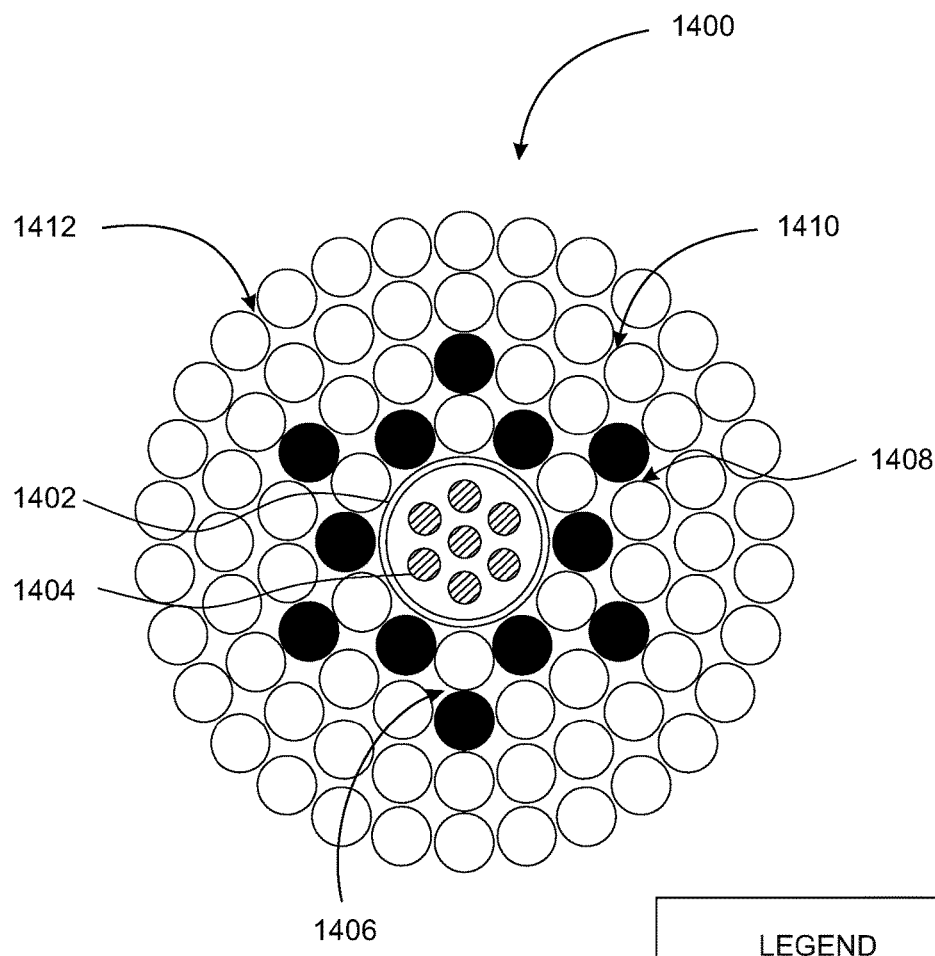
FIG. 14 shows a cross-section of another example roughly-balanced 84-strand OPGW cable, with wires of its innermost layer and its outer layer stranded in a lay direction reverse to the wires of the other two layers, having equal numbers of strands of high electrical conductivity wire in its clockwise stranded layers and in its counter-clockwise stranded layers.

Another specific example of a roughly-balanced OPGW cable, referred to in this document as "the example 4-layer roughly-balanced 84-strand OPGW cable", is illustrated in FIG. 14 and meets the following specifications:
84 strands of wire, all same wire gauge
12 strands of steel required for tensile strength
Layer 1 (stranded in a right-hand, CW direction): 6 strands of aluminum, 6 strands of steel, diameter $D_1$=0.011 m, pitch $p_1$=0.2 m
Layer 2 (stranded in a left-hand, CCW lay direction): 12 strands of aluminum, 6 strands of steel, diameter $D_2$=0.016 m, pitch $p_2$=0.2 m
Layer 3 (stranded in a left-hand, CCW direction): 24 strands of aluminum, diameter $D_3$=0.021 m, pitch $p_3$=0.2 m
Layer 4 (stranded in a right-hand, CW lay direction): 30 strands of aluminum, diameter $D_4$=0.026 m, pitch $p_4$=0.2 m FIG. 14 shows a cross-section of an example cable 1400. The cable 1400 is constructed of a core element 1402 that carries one or more optical fibers 1404, a first layer 1406 composed of 6 aluminum strands and 6 steel strands, a second layer 1408 composed of 12 aluminum strands and 6 steel strands, a third layer 1410 composed of 24 aluminum strands, and a fourth layer 1412 composed of 30 aluminum strands. The cable is "roughly balanced" in that the number of aluminum wires stranded in the right-hand, CW lay direction (6 Al strands from Layer 1 and 30 Al strands from Layer 4) is equal to the number of aluminum wires stranded in the left-hand, CCW lay direction (12 Al strands from Layer 2 and 24 Al strands from Layer 3).

The resistivity of the first layer 1406 is given by the combined resistivity of 6 Al strands and 6 steel strands. The resistivity of the second layer 1408 is given by the combined resistivity of 12 Al strands and 6 steel strands. The resistivity of the third layer 1410 is given by the combined resistivity of 24 Al strands. The resistivity of the fourth layer 1412 is given by the combined resistivity of 30 Al strands. The total resistivity of the OPGW cable 1400 is the resistivity of all layers combined in parallel. The proportion of the current that would flow in each layer is based on the inverse ratio of a given layer's resistivity to the total resistivity of the OPGW cable 1400.

Example 9) 4-Layer Low-κ Adjusted Roughly-Balanced 83-Strand OPGW Cable

Figure 15:
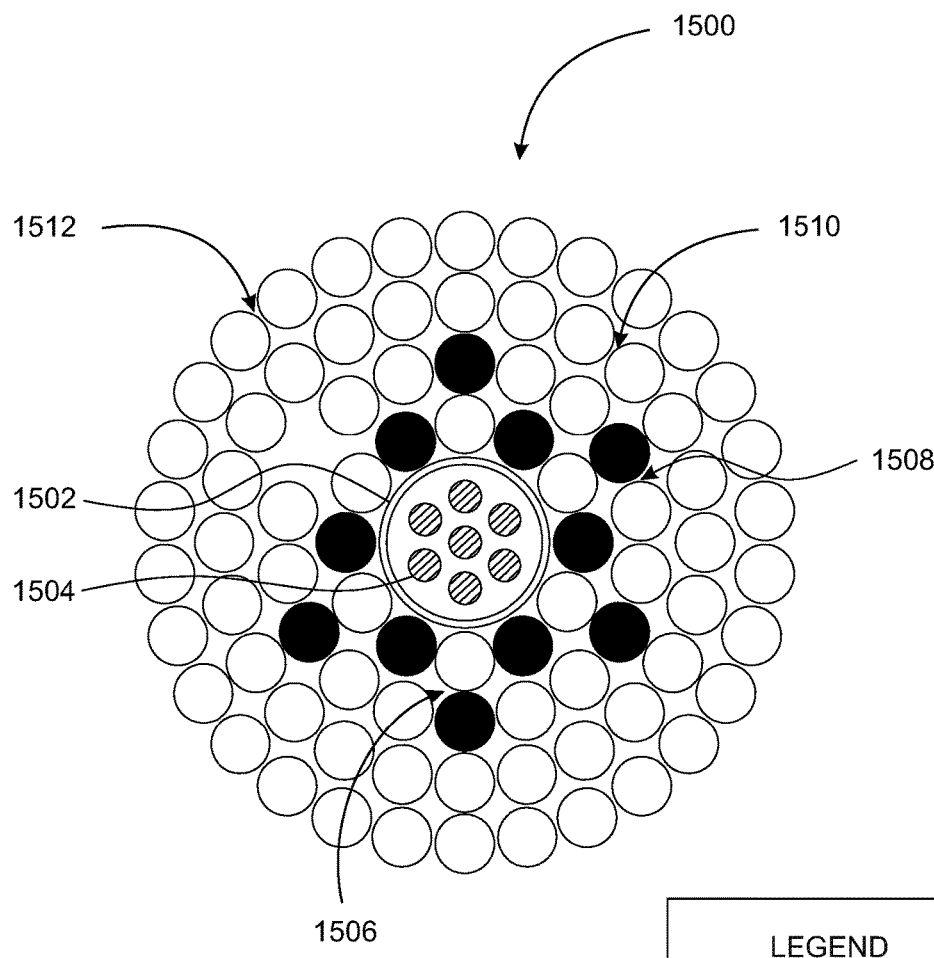
FIG. 15 shows a cross-section of an example low-κ adjusted roughly-balanced 84-strand OPGW cable, with wires of its innermost layer and its outer layer stranded in a lay direction reverse to the wires of the other two layers, having equal numbers of strands of high electrical conductivity wire in its clockwise stranded layers and in its counter-clockwise stranded layers.

A specific example of a low-κ adjusted roughly-balanced OPGW cable, referred to in this document as "the example 4-layer low-κ adjusted roughly-balanced 83-strand OPGW cable", is illustrated in FIG. 15 and meets the following specifications:
83 strands of wire, all same wire gauge
11 strands of steel required for tensile strength
Layer 1 (stranded in a right-hand, CW direction): 6 strands of aluminum, 6 strands of steel, diameter $D_1$=0.011 m, pitch $p_1$=0.2 m
Layer 2 (stranded in a left-hand, CCW lay direction): 12 strands of aluminum, 5 strands of steel, diameter $D_2$=0.016 m, pitch $p_2$=0.2 m
Layer 3 (stranded in a left-hand, CCW direction): 24 strands of aluminum, diameter $D_3$=0.021 m, pitch $p_3$=0.2 m
Layer 4 (stranded in a right-hand, CW lay direction): 30 strands of aluminum, diameter $D_4$=0.026 m, pitch $p_4$=0.2 m FIG. 15 shows a cross-section of an example cable 1500. The cable 1500 is constructed of a core element 1502 that carries one or more optical fibers 1504, a first layer 1506 composed of 6 aluminum strands and 6 steel strands, a second layer 1508 composed of 12 aluminum strands and 5 steel strands, a third layer 1510 composed of 24 aluminum strands, and a fourth layer 1512 composed of 30 aluminum strands. The cable is "roughly balanced" in that the number of aluminum wires stranded in the right-hand, CW lay direction (6 Al strands from Layer 1 and 30 Al strands from Layer 4) is equal to the number of aluminum wires stranded in the left-hand, CCW lay direction (12 Al strands from Layer 2 and 24 Al strands from Layer 3). The cable 1500 differs from the cable 1400 in that the cable 1500 has 1 fewer strand of steel in its innermost first layer 1506.

The resistivity of the first layer 1506 is given by the combined resistivity of 6 Al strands and 6 steel strands. The resistivity of the second layer 1508 is given by the combined resistivity of 12 Al strands and 5 steel strands. The resistivity of the third layer 1510 is given by the combined resistivity of 24 Al strands. The resistivity of the fourth layer 1512 is given by the combined resistivity of 30 Al strands. The total resistivity of the OPGW cable 1500 is the resistivity of all layers combined in parallel. The proportion of the current that would flow in each layer is based on the inverse ratio of a given layer's resistivity to the total resistivity of the OPGW cable 1500.

Example 10) 4-Layer Low-κ Adjusted Pitch-Adjusted Roughly-Balanced 83-Strand OPGW Cable A specific example of a low-κ adjusted pitch-adjusted roughly-balanced OPGW cable, referred to in this document as "the example 4-layer low-κ adjusted pitch-adjusted roughly-balanced 83-strand OPGW cable", meets the following specifications:
83 strands of wire, all same wire gauge
11 strands of steel required for tensile strength
Layer 1 (stranded in a right-hand, CW direction): 6 strands of aluminum, 6 strands of steel, diameter $D_1$=0.011 m, pitch $p_1$=0.180 m
Layer 2 (stranded in a left-hand, CCW lay direction): 12 strands of aluminum, 5 strands of steel, diameter $D_2$=0.016 m, pitch $p_2$=0.2 m
Layer 3 (stranded in a left-hand, CCW direction): 24 strands of aluminum, diameter $D_3$=0.021 m, pitch $p_3$=0.2 m
Layer 4 (stranded in a right-hand, CW lay direction): 30 strands of aluminum, diameter $D_4$=0.026 m, pitch $p_4$=0.2 m The example 4-layer low-κ adjusted pitch-adjusted roughly-balanced 83-strand OPGW cable differs from the 4-layer low-κ adjusted roughly-balanced 83-strand OPGW cable (Example 9) in that pitch of layer 1 has been shortened by 20 mm.

Lightning Strikes and Rate of Change of SOP

Now consider a lightning strike on these example cables, that causes current to travel along 100 m of the cable before being shunted to Earth ground by a tower. Equation 7 can be used to calculate the rate of change of SOP.

A typical lightning strike has a transition time of 5 μsec and induces a current of 30 kA. In the example 2-layer conventional 30-strand OPGW cable (Example 1), that typical lightning strike will cause a rate of change of SOP of 1.98 Mrad/s, which is difficult for currently available coherent technologies to track. In contrast, in the example 2-layer roughly-balanced 30-strand OPGW cable (Example 2), that typical lightning strike will cause a rate of change of SOP of 17.5 krad/s, which is well within the tracking ability of currently available coherent technologies. Locating the aluminum strands equally in the inner layer and in the outer layer reduces the rate of change of SOP resulting from a typical lightning strike by over 2 orders of magnitude.

In the example 2-layer roughly-balanced 27-strand OPGW cable (Example 3), that typical lightning strike will cause a rate of change of SOP of 550 rad/s, which is well within the tracking ability of currently available coherent technologies.

In the example 2-layer pitch-adjusted roughly-balanced 30-strand OPGW cable (Example 4), that typical lightning strike will cause a rate of change of SOP of 390 rad/s, which is well within the tracking ability of currently available coherent technologies.

In the example 4-layer 84-strand OPGW cable (Example 5), that typical lightning strike will cause a rate of change of SOP of 621 krad/s, which is beyond the capability for some available coherent technologies to track. In contrast, in the example 4-layer roughly-balanced 84-strand OPGW cable with alternately reversed lay direction stranding (Example 6), that typical lightning strike will cause a rate of change of SOP of 15.5 krad/s, which is well within the tracking ability of currently available coherent technologies.

In the example 4-layer pitch-adjusted roughly-balanced 84-strand OPGW cable with alternately reversed lay direction stranding (Example 7), that typical lightning strike will cause a rate of change of SOP of 33 rad/s, which is virtually zero!

In the example 4-layer roughly-balanced 84-strand OPGW cable (Example 8), that typical lightning strike will cause a rate of change of SOP of 20.9 krad/s, which is within the tracking capability of currently available coherent technologies.

In the example 4-layer low-κ adjusted roughly-balanced 83-strand OPGW cable (Example 9), that typical lightning strike will cause a rate of change of SOP of 19.8 krad/s, which is well within the tracking ability of currently available coherent technologies.

In the example 4-layer low-κ adjusted pitch-adjusted roughly-balanced 83-strand OPGW cable (Example 10), that typical lightning strike will cause a rate of change of SOP of 1.1 krad/s, which is well within the tracking ability of currently available coherent technologies.

An extreme lightning strike has a transition time of 1 μsec and induces a current of 100 kA. In the example 2-layer conventional 30-strand OPGW cable (Example 1), that extreme lightning strike will cause a rate of change of SOP of 32.9 Mrad/s, which is far beyond the tracking ability of currently available coherent technologies. In contrast, in the example 2-layer roughly-balanced 30-strand OPGW cable (Example 2), that extreme lightning strike will cause a rate of change of SOP of 292 krad/s, which is still within the tracking ability of many currently available coherent technologies. By using a cable having equal numbers of strands of high electrical conductivity wire in the inner layer and in the outer layer, the rate of change of SOP resulting from an extreme lightning strike is reduced to a trackable amount.

In the example 2-layer roughly-balanced 27-strand OPGW cable (Example 3), that extreme lightning strike will cause a rate of change of SOP of 8.4 krad/s, which is well within the tracking ability of currently available coherent technologies.

In the example 2-layer pitch-adjusted roughly-balanced 30-strand OPGW cable (Example 4), that extreme lightning strike will cause a rate of change of SOP of 6.5 krad/s, which is well within the tracking ability of currently available coherent technologies. Thus pitch-adjusted roughly-balanced OPGW cable may improve the resilience of SOP to even extreme lightning strikes.

These calculations are summarized in Table 1:

TABLE 1

| Example | Rate of Change of SOP due to Typical Lightning Strike | Rate of Change of SOP due to Extreme Lightning Strike |
| --- | --- | --- |
| 1) Conventional 2-layer 30-strand OPGW cable | 1.98 Mrad/s | 32.9 Mrad/s |
| 2) 2-layer roughly-balanced 30-strand OPGW cable | 17.5 krad/s | 292 krad/s |
| 3) 2-layer low-κ adjusted roughly-balanced 27-strand OPGW cable | 550 rad/s | 8.4 krad/s |
| 4) 2-layer pitch-adjusted roughly-balanced 30-strand OPGW cable | 390 rad/s | 6.5 krad/s |
| 5) 4-layer 84-strand OPGW cable | 621 krad/s | 10.3 Mrad/s |
| 6) 4-layer roughly-balanced 84-strand OPGW cable with alternately reversed lay direction stranding | 15.5 krad/s | 259 krad/s |
| 7) 4-layer pitch-adjusted roughly-balanced 84-strand OPGW cable with alternately reversed lay direction stranding | 33 rad/s | 545 rad/s |
| 8) 4-layer roughly-balanced 84-strand OPGW cable | 20.9 krad/s | 349 krad/s |
| 9) 4-layer low-κ adjusted roughly-balanced 83-strand OPGW cable | 19.8 krad/s | 331 krad/s |
| 10) 4-layer low-κ adjusted pitch-adjusted roughly-balanced 83-strand OPGW cable | 1.1 krad/s | 19.1 rad/s |

The scope of the claims should not be limited by the details set forth in the examples, but should be given the broadest interpretation consistent with the description as a whole.

What is claimed is:

1. An optical ground wire (OPGW) cable comprising:
a core element carrying one or more optical fibers;
N layers of concentric stranded wires, where N is an integer and N≥2, the stranded wires comprising strands of higher electrical conductivity wire and strands of lower electrical conductivity wire,
wherein the wires are stranded in a right-hand, clockwise lay direction in M of the layers and the wires are stranded in a left-hand, counter-clockwise lay direction in the remaining (N−M) layers, where M is an integer, M is less than N, and M≥1, and
wherein a total number of strands of the higher electrical conductivity wire in the M layers whose wires are stranded in the right-hand, clockwise lay direction is equal to a total number of strands of the higher electrical conductivity wire in the remaining (N−M) layers whose wires are stranded in the left-hand, counter-clockwise lay direction.

2. The OPGW cable as recited in claim 1, wherein the higher electrical conductivity wire comprises aluminum, aluminum alloy, copper, or copper alloy.

3. The OPGW cable as recited in claim 1, wherein the lower electrical conductivity wire comprises steel or aluminum-clad steel.

4. The OPGW cable as recited in claim 1, wherein N is equal to 2, M is equal to 1, the wires of an inner layer are stranded in an inner helix structure characterized by an inner diameter $D_{inner}$ and by an inner pitch $p_{inner}$, and the wires of an outer layer are stranded in an outer helix structure characterized by an outer diameter $D_{outer}$ and by an outer pitch $p_{outer}$.

5. The OPGW cable as recited in claim 4, wherein an actual ratio of an outer current $I_{outer}$ in the wires of the outer layer to an inner current $I_{inner}$ in the wires of the inner layer is within 10 percent of an ideal ratio of the outer current $I_{outer}$ to the inner current $I_{inner}$, the actual ratio calculated as a ratio of combined resistivity of the strands of the inner layer to combined resistivity of the strands of the outer layer, and the ideal ratio calculated as:

$$\left(\frac{I_{outer}}{I_{inner}}\right)^{IDEAL} = \frac{D_{outer}}{D_{inner}} \times \frac{\sin\left(\arctan\left(\frac{\pi D_{inner}}{p_{inner}}\right)\right)}{\sin\left(\arctan\left(\frac{\pi D_{outer}}{p_{outer}}\right)\right)}.$$

6. The OPGW cable as recited in claim 5, wherein the actual ratio is within 2 percent of the ideal ratio.

7. The OPGW cable as recited in claim 1, wherein N is equal to 4, M is equal to 2, and the lay direction of stranding of the wires alternates from one layer to the next.

8. The OPGW cable as recited in claim 1, wherein N is equal to 4, M is equal to 2, and wires of an innermost layer and of an outermost layer are stranded in a first lay direction, and wires of the other two layers are stranded in a second lay direction that is reverse to the first lay direction.

9. The OPGW cable as recited in claim 1, wherein a difference in a number of wires in one of the layers and a number of wires in an adjacent layer is not equal to 6.

10. An optical ground wire (OPGW) cable comprising:
a core element carrying one or more optical fibers;
an inner layer of concentric stranded wires stranded in an inner helix structure characterized by an inner diameter $D_{inner}$ and by an inner pitch $p_{inner}$; and
an outer layer of concentric stranded wires stranded in an outer helix structure characterized by an outer diameter $D_{outer}$ and by an outer pitch $p_{outer}$,
wherein the wires are stranded in a right-hand, clockwise lay direction in one of the layers and the wires are stranded in a left-hand, counter-clockwise lay direction in the other layers, and
wherein an actual ratio of an outer current $I_{outer}$ in the wires of the outer layer to an inner current $I_{inner}$ in the wires of the inner layer is within 10 percent of an ideal ratio of the outer current $I_{outer}$ to the inner current $I_{inner}$, the actual ratio calculated as a ratio of combined resistivity of the strands of the inner layer to combined resistivity of the strands of the outer layer, and the ideal ratio calculated as:

$$\left(\frac{I_{outer}}{I_{inner}}\right)^{IDEAL} = \frac{D_{outer}}{D_{inner}} \times \frac{\sin\left(\arctan\left(\frac{\pi D_{inner}}{p_{inner}}\right)\right)}{\sin\left(\arctan\left(\frac{\pi D_{outer}}{p_{outer}}\right)\right)}.$$

11. The OPGW cable as recited in claim 10, wherein the actual ratio is within 2 percent of the ideal ratio.

12. The OPGW cable as recited in claim 10, wherein a difference in a number of wires in the outer layer and a number of wires in the inner layer is not equal to 6.

* * * * *